United States Patent [19]
Pelley

[11] 4,372,423
[45] Feb. 8, 1983

[54] ESCAPE CHUTE

[76] Inventor: Ronald L. Pelley, 760 E. Telegraph Rd., Box 385, Fillmore, Calif. 93015

[21] Appl. No.: 222,306

[22] Filed: Jan. 5, 1981

[51] Int. Cl.³ .......................... B64D 17/00; A62B 1/20

[52] U.S. Cl. ....................................... 182/42; 244/142; 182/3

[58] Field of Search ............... 182/48, 49, 3; 244/142; 272/56.5 R; 193/25 R, 2 R, 32

[56] References Cited

U.S. PATENT DOCUMENTS

| | | | |
|---|---|---|---|
| 2,779,596 | 1/1957 | Ridgway | 182/48 |
| 3,973,644 | 8/1976 | Zephinie | 182/48 |
| 3,977,312 | 8/1976 | Kissell | 244/142 |
| 4,099,595 | 7/1978 | Tracy | 182/48 |
| 4,099,596 | 7/1978 | Tracy | 182/48 |
| 4,105,173 | 8/1978 | Bucker | 244/146 |
| 4,122,934 | 10/1978 | Moreno | 182/48 |

FOREIGN PATENT DOCUMENTS

| | | | |
|---|---|---|---|
| 1339414 | 12/1973 | United Kingdom | 272/56.5 |

*Primary Examiner*—Reinaldo P. Machado

[57] ABSTRACT

A safety chute for enabling people to escape from a building during an emergency which consists of a tube, a water tank located at the bottom of the tube, and a parachute inside the tube for controlling the velocity of the descending person. By raising the water level above the tube exit, air is trapped between the water and the parachute, thereby providing the upward pressure on the parachute during the descent.

5 Claims, 2 Drawing Figures

ESCAPE CHUTE

BACKGROUND OF THE INVENTION

This invention relates to escape chutes and, more specifically, to a parachute device inflated and confined within a tube.

Heretofore, parachute devices have been proposed for the descent of persons from high rise buildings during a fire or other emergencies. These parachutes suffer from the disadvantage of being very large in order to provide for a low descent velocity, may result in the person landing upon power or telephone lines, or if landing upon concrete or asphalt, a person is likely to be injured. Accordingly, the primary object of the instant invention is to provide for a safe and controlled descent of a person egressing from a building during an emergency.

Further objects and advantages of my invention will become apparent from a consideration of the drawings and ensuing description thereof.

SUMMARY OF THE INVENTION

This invention consists of a parachute which is designed to be inflated and opened within a tube upon the initial descent of a person. Upon opening, the parachute expands and fills up the cross-sectional area of the tube. To increase the upward force on the parachute, a tank filled with water is provided at the bottom of the tube. The top of the water is raised to a level which is slightly above the bottom of the tube. The primary function of the water is to perform as a valve. That is, the water entrappes the air within the tube below the parachute during descent. In addition, the water provides for a soft landing of the descending person and also allows for the immediate descent of another person as the water provides for the continuous sealing of the base of the tube.

DESCRIPTION OF THE PREFERRED EMBODIMENT

Figure 1:
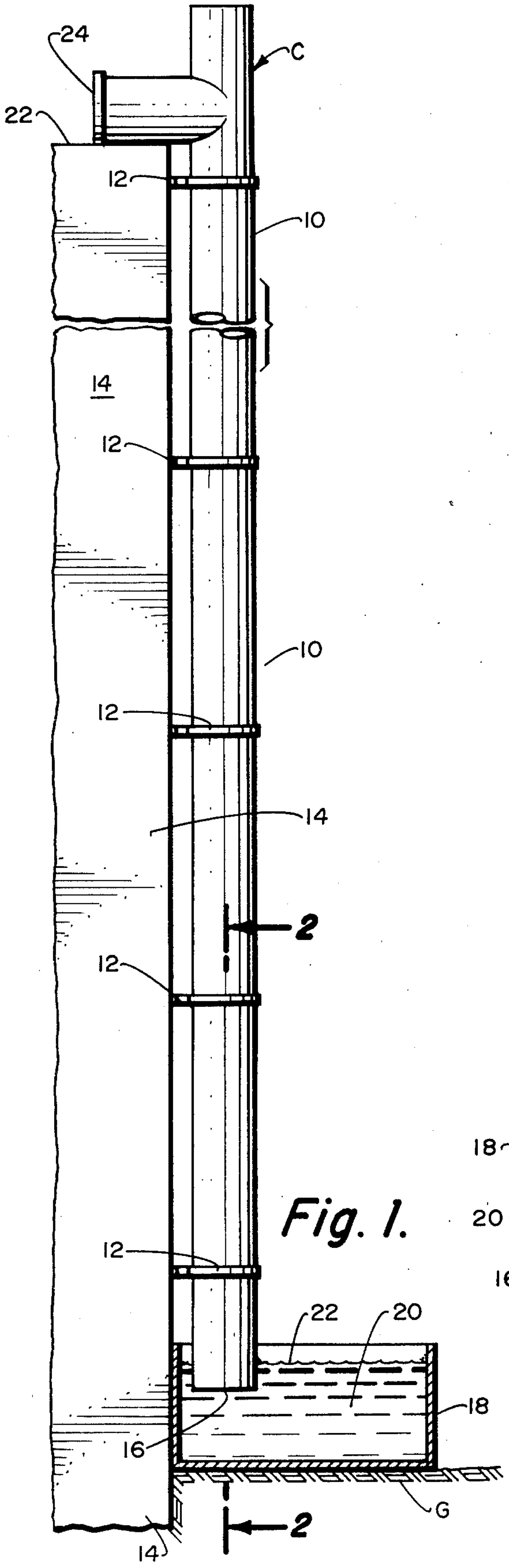
FIG. 1 shows a side view of the instant invention mounted against the outside wall of a building.

FIG. 1 shows a form of the invention with the device C attached to the outside of a building. The device C includes rigid tube 10 which extends from either one of the upper story windows or the top of the building 22 to near the ground level. The tube 10 is generally circular in shape. Attachments 12 are provided for supporting the tube 10 to the building 14.

Figure 2:
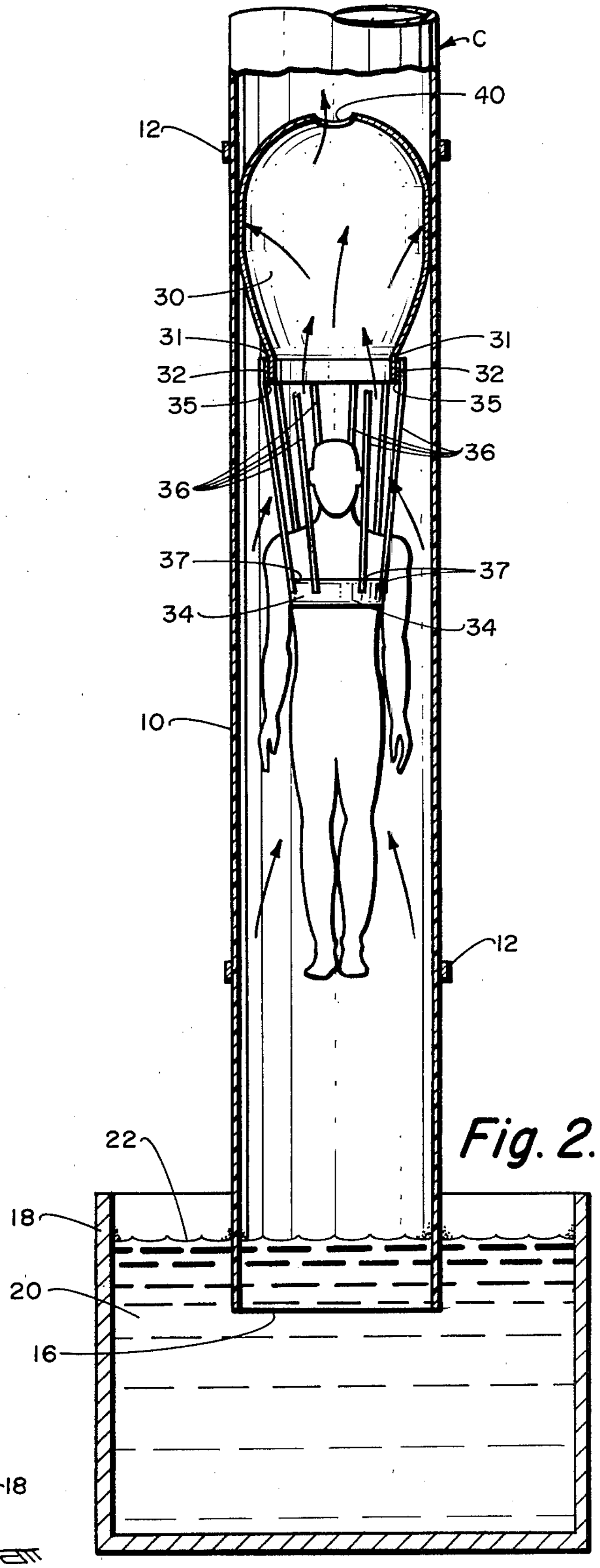
FIG. 2 is a side sectional view taken on the line 2—2 of FIG. 1.

FIGS. 1 and 2 show the parachute in the inflated configuration descending within the tube 10. The parachute canopy 30 consist of a film of cloth or plastic material which when inflated, fills up all or most of the cross-sectional area of the tube 10. The parachute canopy 30 is attached 31 to a rigid tubular frame 32. A rigid frame 32 is preferred as it provides additional assurance that the parachute canopy 30 will inflate during the initial descent of the egressing person. The frame 32 is attached 35 to support lines 36. The lines 36 are attached 37 at the other end to a personnal support harness 34.

A tank 18 is located at the bottom of the tube 10. The tank 18 is filled with water 20 to a level which is slightly above the tube exit 16. Typically the water surface 22 is about one foot above the tube lower exit 16. One function of the water 20 is to entrap air between the water surface 22 and the parachute canopy 30, thereby resulting in greater upward pressure on the parachute. Another important function of the water is to provide for a soft landing of the descending object. The water tank 18 should be of sufficient debth for the descending person to readily move under the tube exit 16 after landing in the water. Preferably a fireman is positioned at the water tank to help the descending persons exit the water tank 18.

Referring now to the parachute canopy 30, a small opening 40 is provided in the canopy 30. The function of this opening 40 is to allow the entrapped air in the tube 10 to escape at a controlled rate; the opening 40 being sized to achieve a specific descent rate. For example, assuming a tube diameter of about 2-feet, a 150 pound person, and a descent velocity of 10 FT/SEC., an opening of about 2 inches diameter is necessary. A heavier person would descend at a slightly faster velocity. For example, a 250 pound person at the same conditions would descend at a velocity of about 13 FT/SEC. Alternately to the small canopy opening 40, the parachute canopy 30 may be made of a material which is slightly porous.

An opening 24 is provided for the escaping person to enter the tube 10. Although only one opening 24 is shown, a plurality of openings can be provided to allow evacuation of one or more stories of the building. However, unless the openings below the descending person are sealed off, the said person will be in free fall until descending below the lowest opening.

Referring to the tube 10 shown in FIGS. 1 and 2, the tube 10 may be attached to the side of a building 14 or alternately may be placed within the building such as in a shaft. In the preferred embodiment, the tube 10 is rigid and permanently in place. An alternate design is to make the tube 10 out of a flexible and collapsable material. This design, not shown, may be stored on one of the upper stories and deployed when required. Alternately, a flexible tube 10 may be transported to the site and using a crane, the deployed tube can be supported above the ground. With a transportable tube, a tank of water may not be appropriate for sealing the tube exit 16 due to the heavy weight of the water.

Alternate means of sealing the lower end of the tube 16 during the descent may include fast acting valves or an inflatable bag placed within the tube; the bag being inflated to seal off the tube exit 16 during descent, and then deflated to allow the person to exit the tube 10. The disadvantages of mechanical valves is that said valves require some time to open and close and therefore cause some delay in the descending of subsequent egressing persons as compared to the water tanks, which provides for the effective continuous sealing of the tube exit.

Referring now to the parachute canopy 30, the greater tube pressure below the canopy 30 provides to force the cloth like material against the tube 10 inner wall and to restrict the escape of the air within the tube 10. By using a flexible material, the parachute canopy may readily conform to various anomalies in the tube 10 inner surface such as pipe joints. An alternate means of restricting the flow of air above the descending person would be to employ a rigid, slidable plug whose size is slightly smaller than the tube 10. However, a rigid plug has the disadvantages of not readily conforming to changes in the tube dimensions and would also tend to be bulky in storage.

The primary purpose of the instant invention is intended for emergency descent. However, the invention may also be used to raise an object within the tube by providing a blower near the base of the tube and pressurizing the tube. One use of this later configuration would be for rescueing people in a mine. An additional use for the device C would be to use said device to lower fruit such as avocados from a hillside. For this purpose, a rail system inside the tube may be used to guide the fruit container within said tube. Another potential use of the instant invention would be to use the device for an amusement park ride, particularly using clear tubeing.

While the above description contains many specificities, these should not be construed as limitations of the scope of the invention, but rather as an exemplification of one preferred embodiment thereof. Many other variations are possible, for example padding may be placed inside the tube to reduce the possibility of scraping, or the tube exit may be flared the enable easier exiting. Accordingly, the scope of the invention should be determined not by the embodiment illustrated, but by the appended claims and their legal equivalents.

What is claimed is:

1. An apparatus for descending an object from an elevated location comprising:
- an elongated tube;
- a means of restricting the air flow through the lower tube exit; and
- a descending device within said tube connected to said descending object, said device restricting the relative upward air flow passed said device during the descent, whereby a buildup of pressure occurs below said descending device during the descent.

2. An apparatus for descending an object from an elevated location comprising:
- an elongated tube;
- a means of restricting the air flow through the lower tube exit; and
- a parachute located within said tube, said parachute connected to the descending object, whereby a buildup of pressure occurs below said descending parachute during the descent.

3. An apparatus for descending one or more objects from an elevated location comprising:
- an elongated tube;
- a tank of water or liquid located at the tube lower exit with the water surface level being above the tube exit; and
- a parachute located within said tube, said parachute being attachable to the descending object.

4. A conveyor comprising:
- an elongated tube;
- a means of restricting the air flow through the lower tube exit;
- a parachute located within said tube and connected to the object being conveyed; and
- a means of increasing the air pressure between said parachute and said lower tube exit.

5. The apparatus of claim 1 wherein a tank of water or other liquid is used as the means or restricting the air flow through the lower tube exit, the liquid surface level being above said exit.

* * * * *